Patented July 7, 1925.

1,545,330

UNITED STATES PATENT OFFICE.

PAUL JÖRN, OF HAMBURG, GERMANY.

PRESERVING OF SAUSAGES SIMILAR TO VIENNA OR FRANKFORT SAUSAGES.

No Drawing.   Application filed January 15, 1925.   Serial No. 2,557.

*To all whom it may concern:*

Be it known that I, PAUL JÖRN, a citizen of Germany, residing at Hamburg, Germany, have invented certain new and useful Improvements in or Relating to the Preserving of Sausages Similar to Vienna or Frankfort Sausages, of which the following a specification.

Suggestions have already been made with regard to preserving sausages, consisting largely of meat and fat, by embedding them in fat. The fact is furthermore well-known, that boiled hams are preserved by packing them in tins, the latter being then evacuated and heated.

My present invention relates to a combination of these two known methods of treatment, and to the application of them to sausages, similar to Vienna or Frankfort sausages, whereby very considerable advantages with reference to their taste and imperishable nature are produced. On account of the fact, that the sausages in question contain a great quantity of water, it was quite natural to assume that these sausages would require quite a different method for preserving them from decomposition than sausages consisting of meat and fat only, or ham which is tinned in its own fat and juice. It could therefore not be foreseen that these methods which were known already, could be adapted for sausages of this kind.

Hitherto these sausages were preserved by laying them in salt water into air-tight tins and then heating them to approximately 100° C. The warm salt fluid, in such a process extracted the juice from the sausages and had an unfavourable effect upon the taste, the sausage skin also becoming tough and hard on account of the action of the salt water. Although the greatest care was taken, up till now a considerable portion of the sausages preserved in this manner decomposed and had to be thrown away as unfit for consumption, when the tins were not quite full of fluid and the sausages therefore not completely covered. As water often squirts out when the tins are being closed, the conditions last mentioned often occur. Sausages which have been preserved in this manner are by no means fit for exportation to tropical countries. In order to kill the germs in such a manner as is necessary for this purpose, so high a temperature or so great a boiling pressure is necessary, that the skin of such sausages which contain much water, burst.

All the drawbacks mentioned are avoided by the use of the method of my present invention. The sausages are laid without any moisture, but with the addition of some pure fat into tins of thin material. The tins are evacuated by a vacuum pump, closed and then heated in a water- or steam-bath at a low temperature. In this manner the sausages become practically everlasting, and do not even decompose when the temperature of the outer air is very high.

A considerable advantage of my present method of treatment, compared with the methods as used up till now, is the fact, that less than half the time for cooking and only half of the heat is necessary, on account of the more favourable heat-conductivity, which fat has in comparison with water. None the less, the sausages are absolutely reliable for use in the Tropics.

Whereas the sausages, treated by the methods hitherto known, get a flat taste, as the water surrounding them extracts the flavor, the sausages preserved by my present process, always taste as if they had just been prepared, they are more savoury, can even be consumed when cold, and have no cooked taste. The sausage skin, which is originally tough, gets into a particularly soft condition which is of a lasting nature.

When cooling down after heating, the atmospheric air pressure presses the walls of the tins against the contents in such a manner, that the sausages all lie packed tightly together, they cannot shake or be jerked about and obtain a uniform square shape. The fat is spread over the contents of the tin, when it has melted, and thus embeds each individual sausage in a thin layer of fat. The manner of manipulation according to my process is as follows:

One commences by packing a layer of sausages into the tin of thin material, spreads the fat over these, and continues in a like manner with a second layer. A very small quantity of fat, say 10 gr. of pork dripping per one lb. tin is sufficient. This tin is then evacuated, closed and heated for about 40 minutes in a water- or steam-bath at a temperature of approximately 80° C. In this manner the entire cubic capacity of the tin can be practically fully utilized for packing the sausages. Tins containing the same amount of sausages as formerly, can be made much smaller, with a corresponding saving of material. The tare weight is much less, a fact which is of the greatest economical importance with regard to the costs of forwarding and the charges for custom fees.

I claim:

A process for preserving sausages of the nature of Vienna or Frankfort sausages, which comprises laying the dry sausages into a tin with the addition of some fat, then evacuating the tin, closing the same and heating the same to a temperature above the melting point of the fat but not above the boiling point of water.

In testimony whereof I affix my signature.

PAUL JÖRN.